Nov. 23, 1948.  L. ZIMMERMANN  2,454,418
HYDRAULIC FLOW DIVIDER
Filed Jan. 15, 1944  5 Sheets-Sheet 1
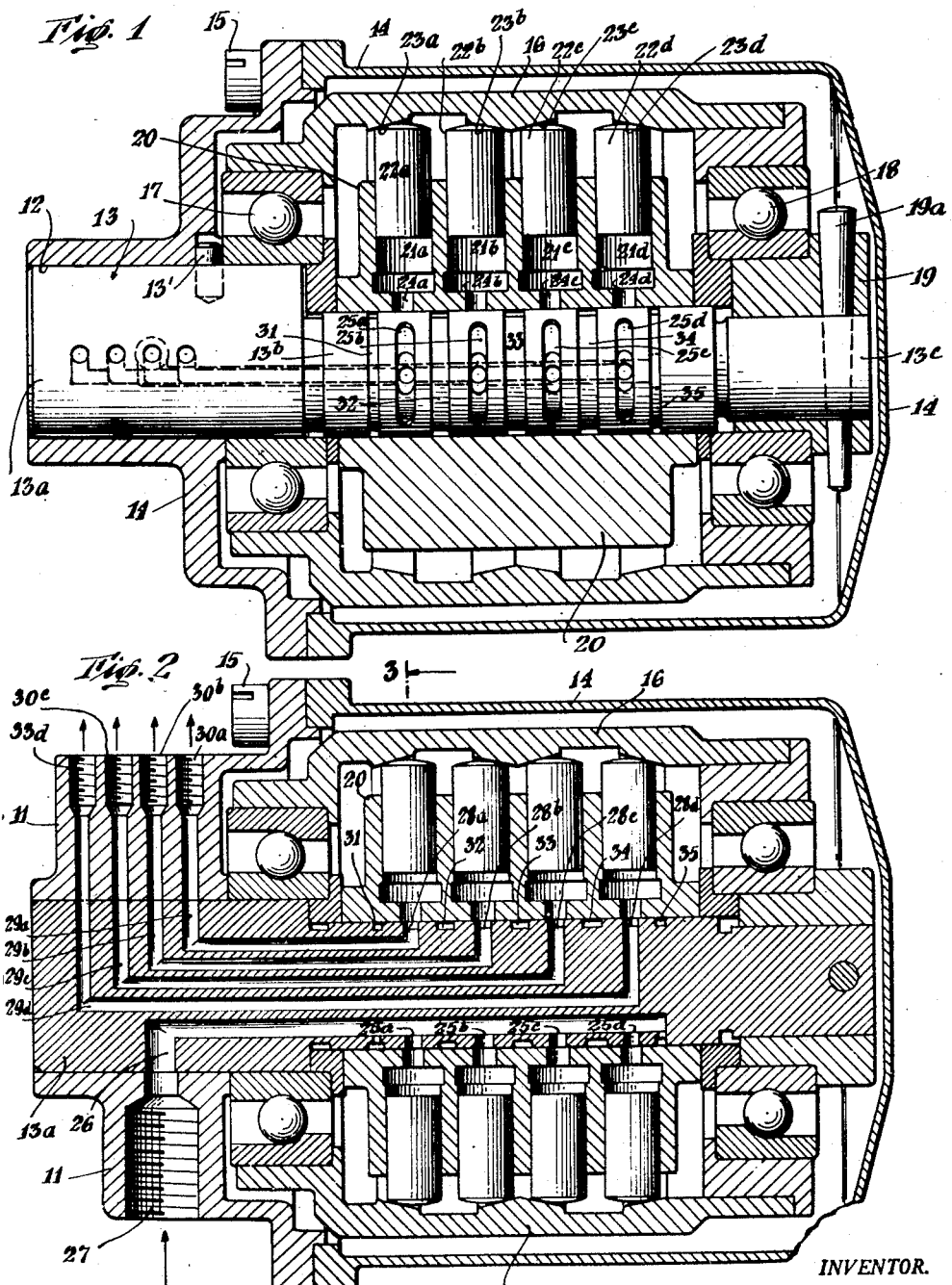
INVENTOR.
Lukas Zimmermann
BY
ATTORNEY.

Nov. 23, 1948.  L. ZIMMERMANN  2,454,418
HYDRAULIC FLOW DIVIDER
Filed Jan. 15, 1944  5 Sheets-Sheet 2
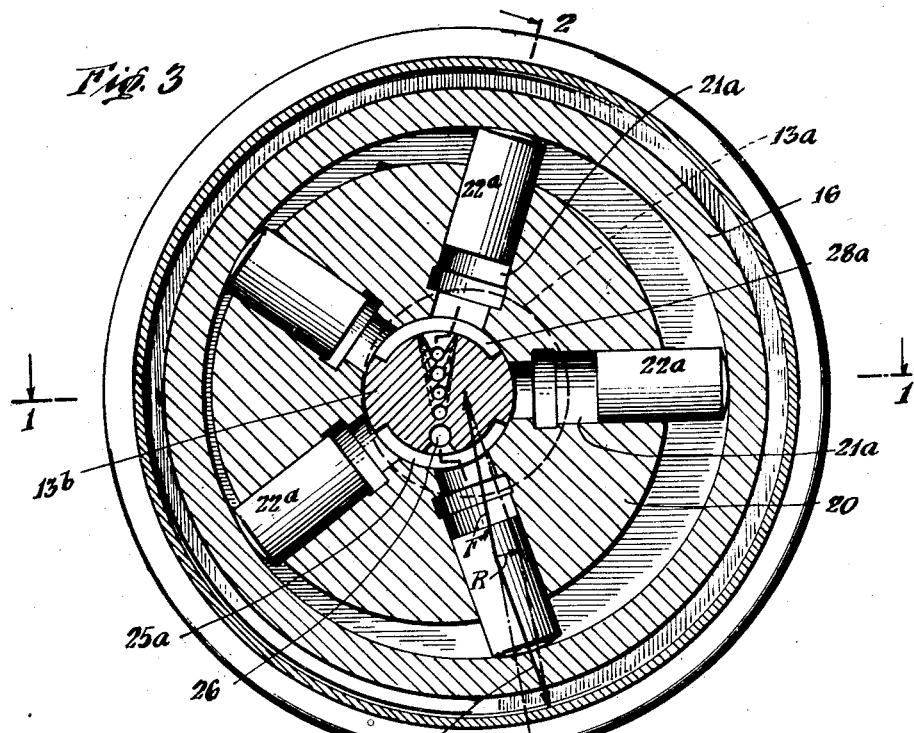
Fig. 3
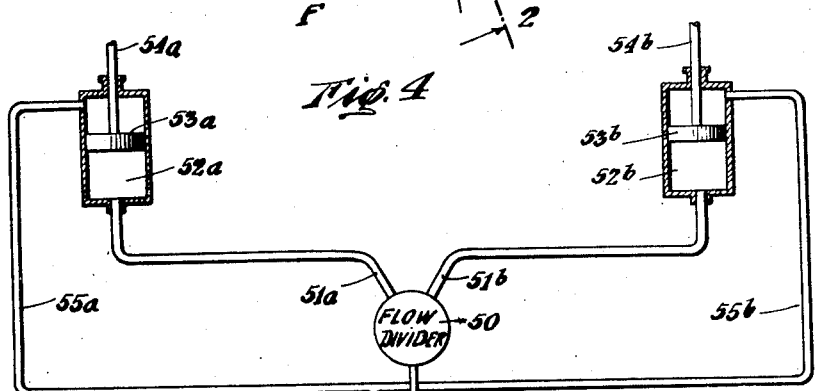
Fig. 4
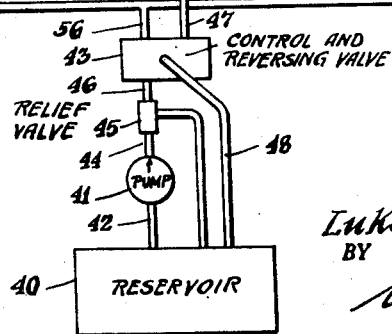
INVENTOR.
Lukas Zimmermann
BY
ATTORNEY Nov. 23, 1948.    L. ZIMMERMANN    2,454,418
HYDRAULIC FLOW DIVIDER
Filed Jan. 15, 1944    5 Sheets-Sheet 3
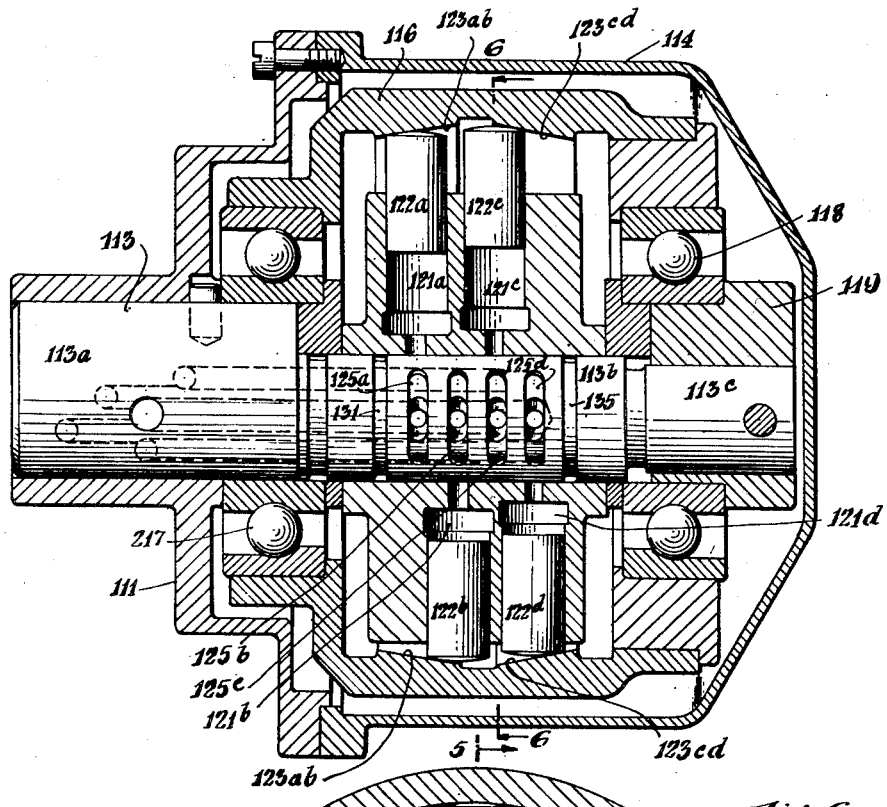
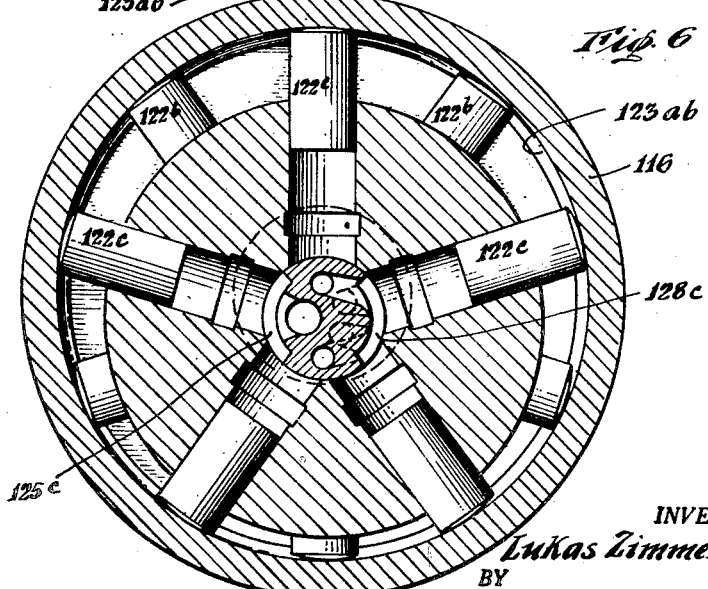
INVENTOR.
Lukas Zimmermann
BY
ATTORNEY

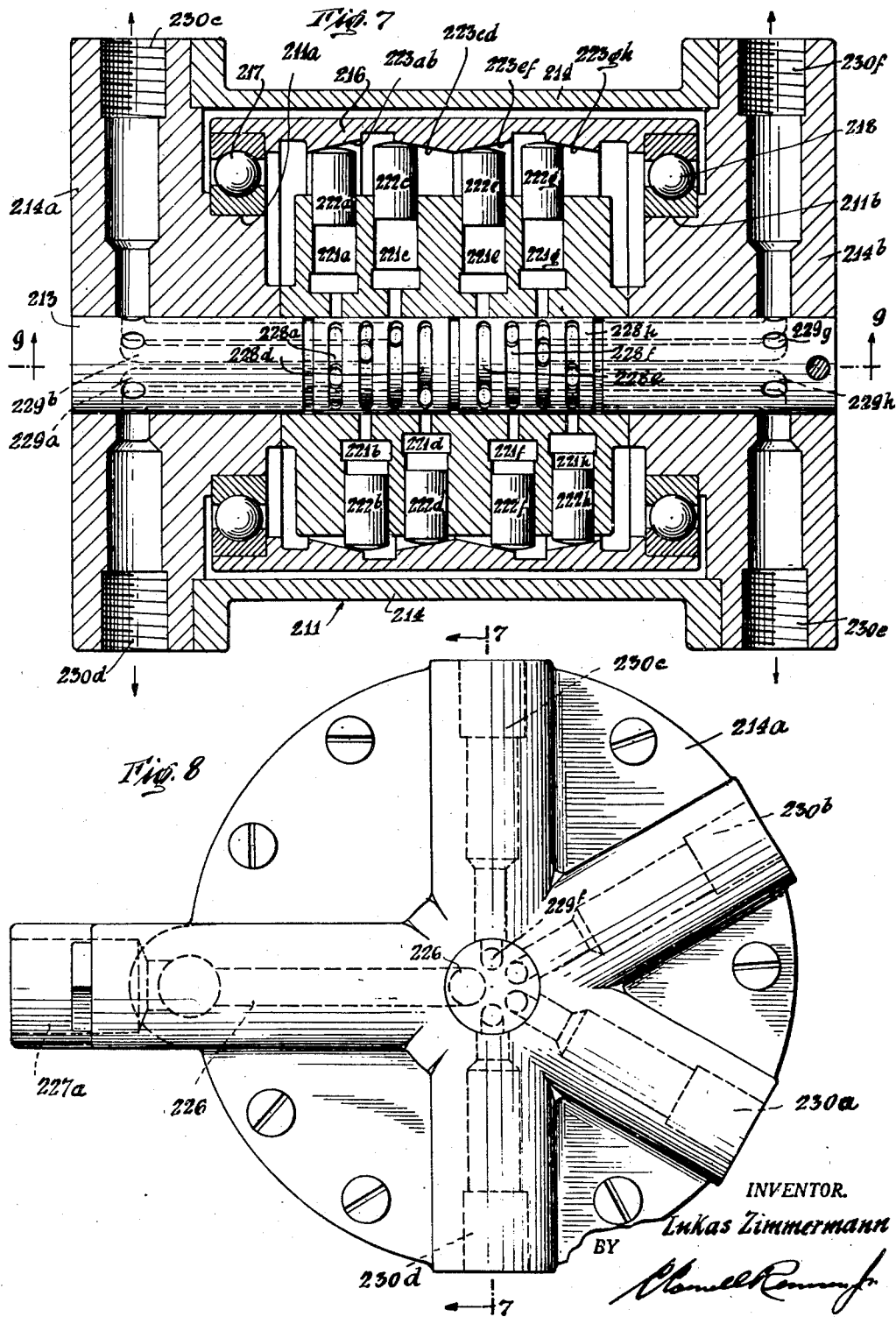

Nov. 23, 1948.　　　　L. ZIMMERMANN　　　　2,454,418
HYDRAULIC FLOW DIVIDER

Filed Jan. 15, 1944　　　　　　　　　5 Sheets—Sheet 5

INVENTOR.
Lukas Zimmermann
BY
ATTORNEY

Patented Nov. 23, 1948

2,454,418

UNITED STATES PATENT OFFICE 2,454,418

HYDRAULIC FLOW DIVIDER

Lukas Zimmermann, Birmingham, Mich.

Application January 15, 1944, Serial No. 518,425

8 Claims. (Cl. 103—1)

This invention relates to hydraulic flow dividers and has for an object to provide an improved device for accurately proportioning the flow of fluid into two or more conduits, irrespective of variations in the pressure in said several conduits.

Another object is to provide a device of this type employing pistons operating in cylinders so that leakage, and therefore errors in distribution, are kept to a minimum.

Another object is to provide such a device of the rotary radial piston type in which the pistons reciprocate in cylinder bores formed in a rotor which is journaled on a pintle, the pintle being so formed as to provide for valving the fluid into and out of the cylinders.

Another object is to provide such a device in which the pintle is formed with a passage which serves as an inlet conduit to all of the cylinders and is also formed with a plurality of passages each connected with a portion of the cylinders so that they receive only the fluid which has passed or is to be passed through the corresponding cylinders.

Another object is to provide a rotor mounted on a pintle, which rotor is formed with a plurality of substantially radial cylinder bores located in substantially the same plane normal to the axis of the rotor and an additional plurality of cylinder bores located in another plane parallel to the first-mentioned plane, and valving means formed on the pintle together with a common inlet passage and separate delivery passages formed in said pintle.

Another object is to provide such a device having a pintle and a rotor thereon, an annular groove being formed in the pintle and/or the rotor, together with means for supplying fluid under pressure to said groove to reduce leakage of fluid from one group of cylinders to another or from one group of cylinders to the casing containing said parts.

Another object is to provide such a flow divider having a plurality of sets of radial cylinders and pistons, the cylinders and pistons of one set being interspersed in part with the cylinders and pistons of the other set.

Another object is to provide such a device comprising a rotor formed with radial cylinder bores and pistons therein and a pintle upon which said rotor is mounted, the pintle being formed with valving means, one for each set of cylinders, and said pintle being formed with two inlet passages, one extending from each end of the pintle and each serving to supply at least one set of cylinders and a plurality of delivery passages extending from each end of the pintle and each connected to an individual set of cylinders.

With the objects above indicated and other objects which will appear from the drawings and the following description, my invention consists in the construction and combination of elements hereinafter described and claimed.

Referring to the drawings:

Fig. 1 is a cross-sectional view taken along the line 1—1 of Fig. 3, looking in the direction of the arrows, the pistons and the pintle being shown in full;

Fig. 2 is a similar view taken along the line 2—2 of Fig. 3 looking in the direction of the arrows;

Fig. 3 is a cross-sectional view taken along the line 3—3 of Fig. 2 looking in the direction of the arrows, the pistons being shown in full;

Fig. 4 shows a hydraulic system including a flow divider and illustrating the method of use thereof;

Fig. 5 is a view, partly in cross-section, of a modified form of the invention taken along the line 5—5 of Fig. 6, looking in the direction of the arrows, the pistons and the pintle being shown in full;

Fig. 6 illustrates the device of Fig. 5 by means of a cross-section taken along the line 6—6 of Fig. 5, looking in the direction of the arrows, the pistons being shown in full;

Fig. 7 is a cross-sectional view of a further modified form of the invention, the pintle and the pistons being shown in full;

Fig. 8 is an end view of the device shown in Fig. 7; and

Figure 9:
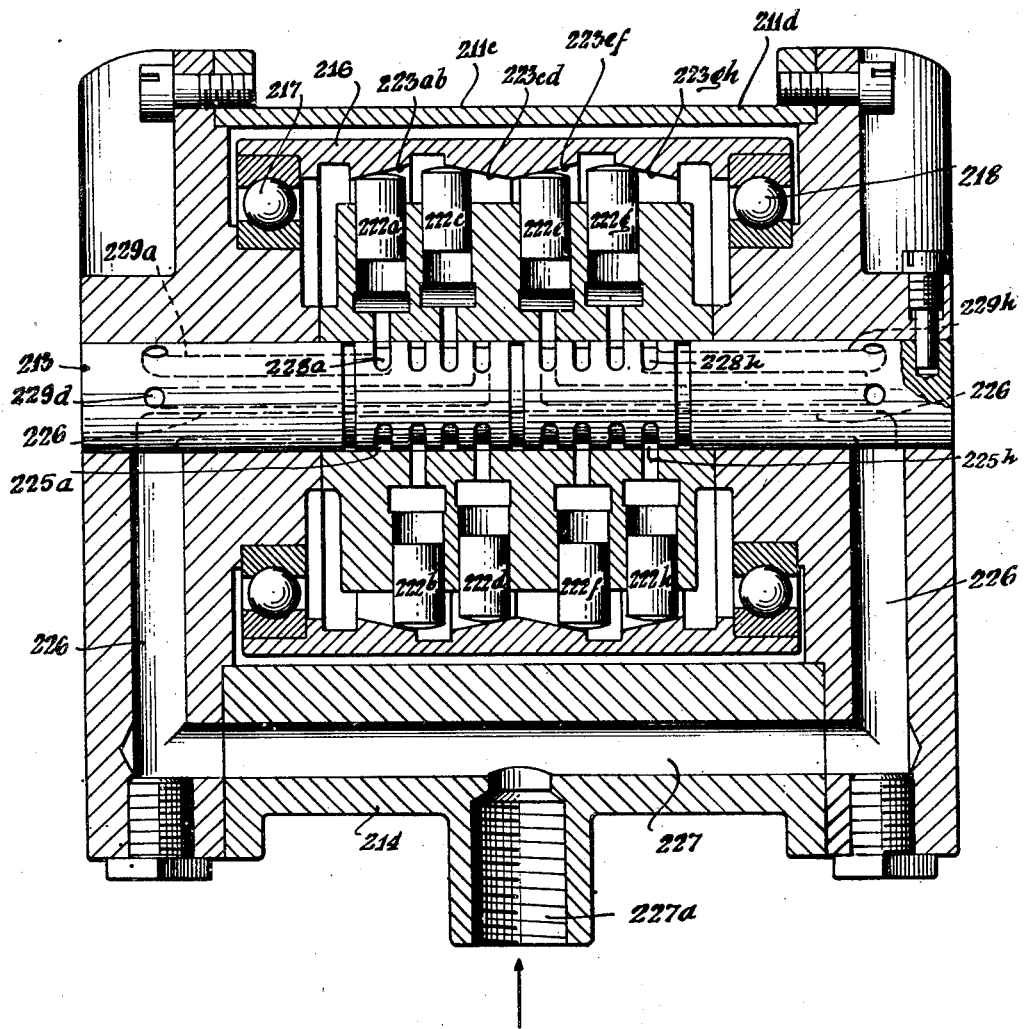
Fig. 9 is a cross-sectional view taken along the line 9—9 of Fig. 7 viewed in the direction of the arrows, the pintle and the pistons being shown in full.

Figs. 1, 2, and 3 illustrate the construction of a four-way flow divider. In said figures, 11 indicates a body member which, in the form shown, has a cylindrical bore 12 within which is firmly fastened as by pin 13' an enlarged cylindrical portion 13a of a pintle 13, which pintle is also formed with a journal portion 13b of smaller diameter whose axis is eccentric to that of the axis of the portion 13a. The further end of the pintle is formed with a reduced extension 13c concentric with 13b. 14 is a housing attached to the body member 11 as by screws 15. 16 indicates an abutment ring mounted on ball bearings 17 and 18 for rotation about the axis of the part 13a. In the form shown, the inner race of the bearing 17 is mounted directly upon the exterior of member 13a. The inner race of ball bearing 18 is mounted upon the eccentric bushing 19 held upon the extension 13c and attached thereto as by taper pin 19a. This bushing is formed with an external cylindrical surface concentric with the portion 13a of the pintle. It will be seen therefore that the abutment ring 16 is mounted for free rotation about the axis of the part 13a which is eccentric to the axis of the journal portion 13b of the pintle.

Journaled upon said journal portion 13b is a rotor 20 provided with five co-planar radial cylinder bores 21a, each having fitted therein a piston 22a.

In the form shown, there are additional series of co-planar radial cylinder bores 21b, 21c, and 21d, receiving respectively pistons 22b, 22c, and 22d. The cylinders are provided with openings 24a, 24b, 24c, and 24d, respectively, which openings are in a line alternately with valve recesses 25a, 25b, 25c, and 25d (Figs. 1 and 3), all of which are connected to the common inlet passage 26 formed in the pintle 13 and connecting with a suitable passage 27 in the body 11, which passage may be formed with threads, as shown in Fig. 2, to receive an appropriate conduit. On the opposite side of the journal portion are formed four valve recesses 28a, 28b, 28c, and 28d. The form of these is seen most easily by referring to the recess 28a in Fig. 3. The said valve recesses are connected through passages 29a, 29b, 29c, and 29d, respectively, which connect respectively with suitable passages 30a, 30b, 30c, and 30d, in the body member 11, each of which passages may be formed with screw threads for connection with an appropriate conduit. The form of the passages 26 and 29a, 29b, 29c and 29d is shown more or less schematically. In actual practice they would not be located in a plane as shown, but would be separated as far as possible to permit of using the largest passages permitted by the size of the pintle. Furthermore, they would be drilled for convenience in manufacture and their outer ends would be permanently plugged.

It will be seen that if fluid under pressure is introduced at 27, it will flow through intake conduit 26 and valve recesses 25a, 25b, 25c, and 25d into all cylinders which are connected to these valve recesses, forcing the pistons outwardly and exerting forces F against the abutment ring 16, as shown for one cylinder in the diagram of forces in Fig. 3.

Due to the eccentricity between rotor and abutment ring, the axis of each piston forms an angle with the radius of the abutment ring passing through the point of contact between piston and abutment ring. This angle will vary as the piston rotates with the rotor. It becomes a maximum at midstroke and zero at the dead center positions. Since the rotor is mounted on bearings which permit it to rotate freely, the contact surface of the rotor can exert a reactionary force F' against the piston only in the direction toward its axis of rotation, i. e., in line with the radius through the contact point. The two forces acting upon each piston, therefore, form an angle with each other, and their resultant R is a force at right angles to the axis of that piston and causes rotation of the rotor in a counter-clockwise direction, as viewed in Fig. 3. As the cylinder approaches the three o'clock position (Fig. 3), it is cut off from communication with the inlet recess 25a. Further movement will cause communication to be established between said cylinder and its corresponding delivery valve recess 28a, 28b, 28c, or 28d to which fluid is discharged during substantially the next half revolution of the rotor. It is obvious that if the cylinders and pistons of the several sets are of the same diameter and number that exactly the same amount of fluid will be delivered into the delivery recesses of the several sets and that therefore the same amount of fluid will be ejected from the openings 30a, 30b, 30c, and 30d. However, should it be desired to have outlet flows of different proportions, this may readily be accomplished by using cylinders of different diameters for the different rows and/or a different number of cylinders. The ring 16, due to friction between the outer ends of the pistons and the ring, will rotate at substantially the same angular speed. However, there is a small relative angular motion between the pistons and the ring due to the eccentricity between the ring and the journal 13b. In order that this relative motion may be effected without rubbing action between the pistons and the abutment ring, the pistons are formed with generally spherical ends, as shown, which ends bear against a conical face 23a, 23b, 23c, or 23d, respectively, on the abutment ring. The result of this construction is that the point of contact between the end of the piston 22a and the conical portion 23a is eccentric to the axis of the piston. Consequently, the piston is forced to oscillate about its axis within its cylinder bore to accommodate the relative motion with respect to the ring 16 without rubbing action between the piston and the ring.

It is obvious that such devices may be made with any plurality of sets of cylinders and pistons. Fig. 4 shows a system employing such a flow divider having two sets of cylinders and pistons. 40 indicates a reservoir or sump from which a pump 41 draws fluid through pipe 42 and delivers to a reversing valve 43 through pipe 44, relief valve 45, and pipe 46. When the reversing valve is in its normal position, fluid is admitted to the flow divider 50 through conduit 47 which is understood to be connected to the opening 27 (Fig. 2). Delivery from the flow divider is divided uniformly between conduits 51a and 51b which are connected at one end with openings such as 30a and 30b of Fig. 2 and at their other end with cylinders 52a and 52b, respectively, having pistons therein 53a and 53b operating rods 54a and 54b, respectively. Said rods may be connected to any parts which are to be operated in synchronism, such as the wing flaps of airplanes, airplane landing gear retracting mechanism, cannon pointing mechanism, or any other devices which are to be operated synchronously. The upper portion of the cylinders are connected by means of conduits 55a and 55b, respectively, to conduit 56 connected to the control and reversing valve 43. Said valve 43 may be of any known or suitable construction which will permit a connection of conduit 46 with conduit 47 while conduit 56 is connected to the discharge conduit 48; while at other times conduit 46 is connected with conduit 56 while conduit 47 is connected with conduit 48. Therefore, after the pistons 53a and 53b have been moved upwardly in synchronism they may be returned downwardly merely by adjusting the reversing valve, at which time pressure from the pump is applied to the top of the pistons 53a and 53b, forcing the pistons downwardly. During this time, fluid below the pistons will enter their respective sections of the flow divider, which will now act as a flow combiner and cause the combined flow to pass through conduits 47 and 48 to the reservoir.

It will be noted that there are no external moving parts, which avoids the necessity of packing glands or similar devices made necessary where shafts extend out of fluid-filled casings. It will also be noted that equal parts or parts of a predetermined proportion of the fluid will be delivered from each of the outlet openings, irrespective of the pressure therein.

It will be further observed that if the delivery of fluid from one of the outlets should be resisted, as when the mechanism operated thereby is jammed, the described flow divider will act as a pressure booster and exert a greater pressure upon the conduit leading to the mechanism most difficult to operate. Assuming a flow divider having two sections and assuming that one of the outlets is open so that its pressure is zero, whereas the other outlet is obstructed, the pressure upon the obstructed line will, in such a case, be substantially double the inlet pressure because it receives the direct pressure available in the inlet line and, furthermore, the free section acts as a hydraulic motor applying a torque to the rotor which will raise the pressure by approximately the amount of the inlet pressure so that this section will deliver approximately double the inlet pressure.

Likewise, in the case of a four-way flow divider, as illustrated in Figs. 1 to 3, the pressure available to operate the member operated by one of the sections may reach a maximum value substantially equal to four times the inlet pressure. This will occur when the pressure against which three sections operate is substantially zero. The pressure relationship for such a flow divider of any number of sections may be stated as the sum of the pressures on the delivery side of all the sections is equal to the inlet pressure times the number of sections. This feature is very important in certain applications, particularly in applications to retractable airplane landing gear and wing flap operating mechanism which occasionally get out of order so that the mechanism in question will need additional pressure for its operation.

Tests of devices such as those illustrated and described have shown remarkable accuracy of flow division. It has been found that with one section operating against zero pressure and another section operating against 1000 pounds per square inch, the inaccuracy of division amounted to less than 1%.

Any inaccuracy which occurs is, of course, due entirely to differential leakage. Since it is necessary for the successful operation of the device that there be sufficient clearance between the moving parts to permit them to slide freely and without undue friction, such leakage cannot be entirely avoided.

Any leakage from the inlet line or from the cylinders connected to the inlet line into the case is of no importance since it does not affect the accuracy of flow division, and such leakage fluid is merely returned to the reservoir by means of a conduit, not shown. Any leakage from the divided lines to the case or from one divided line into another is undesirable since it decreases the accuracy of flow division, and it is of utmost importance that this leakage be held as small as possible.

Apart from variations in viscosity of the fluid, leakage is a function of two factors, i. e., the amount of clearance between the parts and the pressure with which the fluid is forced through this clearance. Obviously, the clearance between the moving parts should be held as small as practically possible. In order to reduce the remaining leakage still further without any further reduction of clearances between the moving parts, and without introducing packings or seals which would cause friction and binding, the journal portion of the pintle is shown as provided with annular grooves 31, 32, 33, 34, and 35 (Fig. 2). The grooves 31 and 35 are shown as connected with the inlet conduit 26 so that they are under inlet pressure. Therefore, they reduce the amount of fluid which might otherwise leak from the end cylinders through the joint between the pintle portion 13b and the rotor 20. The pressure sealing grooves 32, 33, and 34 may or may not be connected with the passage 26, if desired. It is desirable to supply pressure to the end grooves 31 and 35 since the pressure differential between the cylinders of the outside sections and the interior of the casing may be much greater than that between the cylinders of the adjacent sections. If the pressure in such a groove as 31 or 35 is increased to the point where it equals the pressure in the adjacent cylinders, the leakage will obviously be reduced to zero. There will, however, be a leakage from the groove into the interior of the casing but this will have no effect upon the accuracy of the flow division because the fluid thus leaking out is not supplied from the fluid after division but from the intake lines. The pressure supplied to the grooves 31 and 35 is, of course, usually slightly higher than the pressure in the outlet lines due to frictional losses, so that in addition to stopping the leakage from the end sections a small amount of fluid may be caused to leak into these sections. However, the pressure differential causing such a leakage is considerably smaller than the operating pressure and, hence, the leakage introduced by it is only a small fraction of the leakage it serves to prevent. This leakage is so small that when added to all the other possible leakages, the total leakage is as small as indicated above.

Instead of supplying fluid to grooves 31 and 35 from the inlet line of the flow divider an additional passage in the pintle may be provided through which the system may be connected to an external pressure source of the desired intensity.

Figs. 5 and 6 illustrate a four-way flow divider in which the cylinders of adjacent sections are partly interspersed with respect to each other, whereby it is possible to shorten the device and to utilize only two conical surfaces on the abutment ring instead of 4, as in the form of Figs. 1, 2, and 3. Corresponding parts bear reference numerals which are the same as those used in Figs. 1, 2, and 3 with the exception that they have been increased by 100. Thus, the casing is indicated by the numeral 111, the pintle generally by the numeral 113, the large part of the pintle by the numeral 113a, the journal part of the pintle by 113b, and the abutment ring by 116. In view of the similarity of the parts, a complete description thereof with reference to all the numerals is believed to be unnecessary as it is felt that reference to the differences in construction will be sufficient.

The abutment ring 116 is provided with but two internal conical surfaces 123ab and 123cd. The pistons 122a of the left-hand section bear against the conical surface 123ab near the smaller end thereof and the pistons 122b of the second section bear against the same conical surface 123ab near its larger diameter. Pistons 122c and 122a bear against the conical surface 123cd.

Since the bearing points of pistons 122a and 122d are not as far removed from the axis as the bearing points of cylinders 122b and 122c, and since it is desirable to have the pistons all of the same length, the cylinder bores of the two middle sections are preferably made not quite as deep as those of the end sections to keep the volume of all the cylinders the same.

It will be noted that only two pressure sealing grooves 131 and 135 are provided, which grooves are preferably connected with the inlet passage or an external source of pressure. No grooves have been shown between the various sections because the sections are so close together that such grooves are undesirable.

The functions and operation of various parts are the same as those of the corresponding parts in Figs. 1, 2, and 3.

Figs. 7, 8, and 9 illustrate a flow divider of the interspersed type having provision for division into eight equal parts. In this case corresponding parts bear reference numerals which are the same as those used in Figs. 1, 2, and 3 with the exception that they have been increased by 200. Thus, the casing is indicated by the numeral 211, the pintle generally by the numeral 213, the abutment ring by 216. In view of the similarity of the parts, a complete description thereof is believed to be unnecessary as it is felt that reference to the differences in construction will be sufficient.

The pintle 213 is made of uniform diameter throughout but its axis is located eccentrically with respect to the axis of rotation of the abutment ring 216. This is accomplished by forming the end portions of the body 211 with cylindrical portions 211a and 211b upon which the respective internal ball bearing races are located. The pistons 222a to 222h fit in corresponding cylinders 221a to 221h, respectively. The pistons 222a and 222b bear against a conical surface 223ab on the abutment ring 216. The pistons 222c and 222d bear against a conical surface 223cd, the pistons 222e and 222f bear against the conical surface 223ef, and the pistons 222g and 222h bear against the conical surface 223gh.

The pintle 213 has ten passages therein, five extending from substantially each of its ends to substantially the center of the pintle. If desired, the inlet bores 226 may connect at the center as shown, but the outlet bores 229a to 229h must not connect.

It will be noted that the housing is formed of a generally cylindrical section 214 and end plates 214a and 214b which, as seen in Fig. 8, are formed with ribs, each of which contains one inlet passage 226 or one of the four outlet passages as 230a, 230b, 230c, and 230d. The cylindrical section 214 is also formed with a connecting inlet passage 227 to which is connected a threaded nipple 227a.

It will be noted that fluid under pressure admitted at 227a may pass through passage 227, the two passages 226, into the pintle, and through the inlet valve recesses 225a to 225h to all of the cylinders. When ejected from the cylinders, the fluid flows in equal amounts through the respective eight delivery passages 228a to 228h in the pintle and out of the respective delivery outlets 230a, 230b, 230c, 230d etc.

It will be seen that the construction shown and described provides an eight-way flow divider of minimum axial length since the cylinders of adjacent pairs of sections are interspersed with respect to each other. The described flow divider is, for the reasons outlined above, capable of delivering in one section a pressure approximately eight times that of the inlet pressure.

While the devices described hereinabove are useful primarily as flow dividers, certain aspects thereof are also useful in other devices. Thus the interspersed arrangement of cylinder bores shown in Figs. 5, 6, 7, 8 and 9 is useful also as part of a hydraulic motor or pump. In that application usual or suitable arrangements would be made to extend the rotor to the exterior of the casing to act as a shaft to deliver or receive mechanical power from the exterior. Such an external shaft is, of course, not needed nor desired when the invention is used as a flow divider.

It will be noted that the constructions shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follow.

I claim:

1. In a hydraulic flow divider, a pintle member, a rotor mounted for rotation thereon, at least two sets of cylinders formed within said rotor, pistons in said cylinders, means for causing rotation of the rotor on the pintle upon the occurrence of reciprocation of said pistons within their cylinders, an inlet passage and a plurality of outlet passages formed within said pintle, valving means for connecting the cylinders of each set seriatim with the inlet passage within the pintle at certain times whereby the pistons are caused to move outwardly of the cylinders and for connecting the cylinders, while the pistons move inwardly of the cylinders, with the outlet passages within the pintle related to the respective sets of cylinders, whereby fluid passing into the device will be divided and definite proportions thereof delivered to the several outlet passages.

2. In a hydraulic flow divider, a pintle member, a rotor mounted for rotation thereon, at least two sets of substantially radially disposed cylinders formed within said rotor, pistons in said cylinders, a ring mounted for rotation eccentrically of said pintle and so cooperating with said pistons as to cause rotation of the rotor on the pintle when said pistons reciprocate within their cylinders, an inlet passage and a plurality of outlet passages formed within said pintle, valving means for connecting the cylinders of each set seriatim with the inlet passage within the pintle at certain times whereby the pistons are caused to move outwardly of the cylinders and for connecting the cylinders, while the pistons move inwardly of the cylinders, with the outlet passages within the pintle related to the respective sets of cylinders, whereby fluid passing into the device will be divided and definite proportions thereof delivered to the several outlet passages.

3. In a hydraulic flow divider, a pintle member, a rotor mounted for rotation thereon, at least two sets of cylinders formed within said rotor, pistons in said cylinders, means for causing rotation of the rotor on the pintle upon the occurrence of reciprocation of said pistons within their cylinders, an inlet passage and a plurality of outlet passages formed within said pintle, a set of valve recesses so formed in said pintle as to connect the cylinders of each set seriatim with the inlet passage within the pintle at certain times whereby the pistons are caused to move outwardly of the cylinders and a second set of valve recesses so formed in said pintle as to connect the cylinders while the pistons move inwardly of the cylinders with the outlet passages within the pintle related to the respective sets of cylinders, whereby fluid passing into the device will be divided and definite proportions thereof delivered to the several outlet passages.

4. In a hydraulic flow divider, a pintle member, a rotor mounted for rotation thereon, two sets of substantially radially arranged cylinders formed within said rotor, pistons having their outer ends formed generally spherically located for reciprocation in said cylinders, a ring mounted for rotation eccentrically of said pintle formed with an inwardly facing conical abutment surface against which the pistons of said two sets bear, whereby said rotor is caused to rotate on the pintle when the pistons reciprocate within their cylinders, and inlet and outlet passages formed within said pintle, valving means for connecting the cylinders of each set seriatim with the inlet passage within the pintle while the pistons move outwardly of the cylinders and for connecting the cylinders of said set with a respective outlet passage within the pintle while the pistons move inwardly of the cylinders.

5. In a hydraulic flow divider, a pintle member, a rotor mounted for rotation thereon, two sets of substantially radially arranged cylinders formed within said rotor, pistons having their outer ends formed generally spherically located for reciprocation in said cylinders, a ring mounted for rotation eccentrically of said pintle formed with an inwardly facing conical abutment surface against which the pistons of said two sets bear, whereby said rotor is caused to rotate on the pintle when the pistons reciprocate within their cylinders, an inlet passage and two outlet passages formed within said pintle, one such outlet passage for each said set of cylinders, valving means for connecting the cylinders of each set seriatim with the inlet passage within the pintle while the pistons move outwardly of the cylinders and for connecting the cylinders of said set while the pistons move inwardly of the cylinders with the outlet passage within the pintle related to the respective set of cylinders, whereby fluid passing into the device will be divided and definite proportions thereof delivered to the two outlet passages.

6. In a hydraulic flow divider, a pintle member, a rotor mounted for rotation thereon, two sets of substantially radially arranged cylinders formed within said rotor, the cylinders being so arranged that the cylinders of one set are in part radially interspersed between the cylinders of the other set, pistons having their outer ends formed generally spherically located for reciprocation in said cylinders, a ring mounted for rotation eccentrically of said pintle formed with an inwardly facing conical abutment surface against which the pistons of said two sets bear, whereby said rotor is caused to rotate on the pintle when the pistons reciprocate within their cylinders, and inlet and outlet passages formed within said pintle, valving means for connecting the cylinders of each set seriatim with the inlet passage within the pintle while the pistons move outwardly of the cylinders and for connecting the cylinders of each set, while the pistons move inwardly of the cylinders, with a related outlet passage within the pintle.

7. In a hydraulic device, a pintle member, a rotor mounted for rotation thereon, two sets of cylinders formed within said rotor, the cylinders being so arranged that the cylinders of one set are in part radially interspersed between the cylinders of the other set, pistons in said cylinders, means for causing concomitant reciprocation of said pistons within their cylinders and rotation of the rotor on the pintle, an inlet passage and at least one outlet passage formed within said pintle, valving means for connecting the cylinders of each set seriatim with the inlet passage within the pintle while the pistons move outwardly of the cylinders and for connecting the cylinders, while the pistons move inwardly of the cylinders, with one or more outlet passages within the pintle.

8. In a hydraulic flow divider, a pintle member, a rotor mounted for rotation thereon, two groups of sets of cylinders formed within said rotor, pistons in said cylinders, means for causing concomitant reciprocation of said pistons within their cylinders and rotation of the rotor on the pintle, an inlet passage and two groups of outlet passages formed within said pintle, the outlet passages of one group extending from adjacent the end of the pintle toward the center thereof and the outlet passages of the other group extending from adjacent the other end of the pintle toward the center thereof, a set of inlet valve recesses so formed in said pintle as to connect the cylinders of each set of each group seriatim with the inlet passage within the pintle while the pistons move outwardly of the cylinders and two sets of outlet valve recesses so formed in said pintle as to connect the cylinders while the pistons move inwardly of the cylinders with the outlet passages within the pintle related to the respective sets of cylinders, whereby fluid passing into the device will be divided and definite proportions thereof delivered to the several outlet passages.

LUKAS ZIMMERMANN.

REFERENCES CITED

The following references are of record in the file of this patent:

UNITED STATES PATENTS

| Number | Name | Date |
| --- | --- | --- |
| 1,423,852 | Herman | July 25, 1922 |
| 1,876,833 | Benedek | Sept. 13, 1932 |
| 1,886,393 | Godfriaux | Nov. 8, 1932 |
| 1,998,984 | Ferris | Apr. 23, 1935 |
| 2,105,454 | Ferris | Jan. 11, 1938 |
| 2,254,103 | Douglas | Aug. 26, 1941 |
| 2,291,578 | Johnson | July 28, 1942 |
| 2,343,912 | Lauck | Mar. 14, 1944 |
| 2,353,802 | Zimmerman | July 18, 1944 |

FOREIGN PATENTS

| Number | Country | Date |
| --- | --- | --- |
| 370,345 | Great Britain | Apr. 7, 1932 |